(No Model.)
O. BRAMBLE.
TEA OR COFFEE POT.
No. 340,552. Patented Apr. 27, 1886.
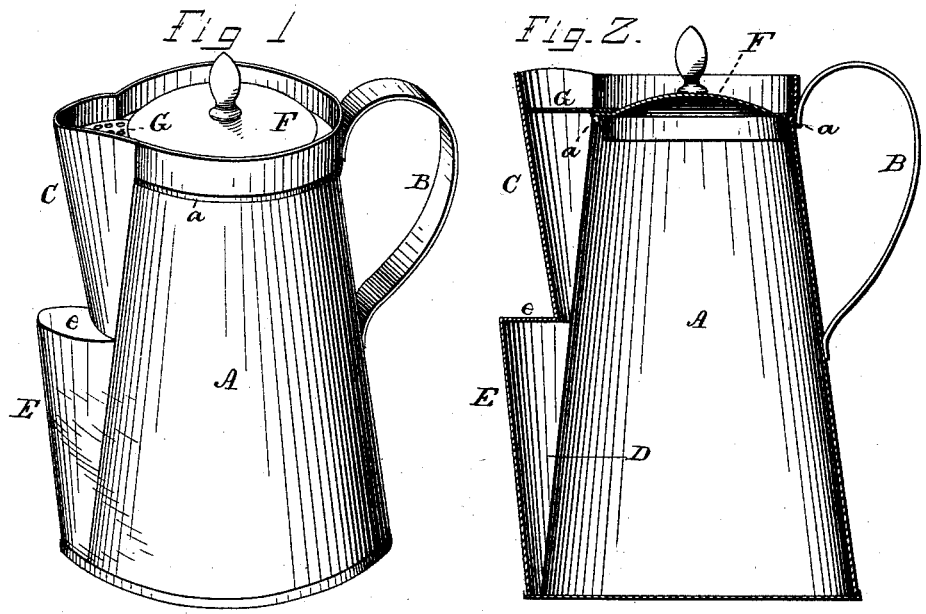
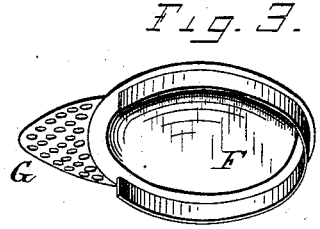
Witnesses.
M. A. Barnes.
Howell Bartle.
Inventor.
Mrs. Ordella Bramble
Per T. W. Tallmadge
Atty.

UNITED STATES PATENT OFFICE.

ORDELLA BRAMBLE, OF FREDERICK, DAKOTA TERRITORY.

TEA OR COFFEE POT.

SPECIFICATION forming part of Letters Patent No. 340,552, dated April 27, 1886.

Application filed June 1, 1885. Serial No. 167,125. (No model.)

*To all whom it may concern:*

Be it known that I, ORDELLA BRAMBLE, a citizen of the United States, residing at Frederick, in the county of Brown and Territory of Dakota, have invented certain new and useful Improvements in Tea and Coffee Pots; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vessels employed for preparing the beverages tea and coffee; and my said invention consists, first, in forming an offset at the bottom of said vessel or "pot," as it is usually called, and, second, in a novel construction of the lid and strainer, which are combined together in one piece and seated below the top edge of the vessel.

The objects desired to be accomplished by this construction are, first, to confine the sediment—tea-leaves or coffee-grounds—at the bottom of the vessel and prevent said sediment, &c., from flowing with the liquid against and through the strainer at the top of vessel while pouring said liquid out of the same, and, second, to render the cleaning of the strainer, interior of pot, and its lid easy of accomplishment.

As now most generally made, the vessels employed for preparing the beverages tea and coffee have the discharge-spout formed at the top edge of the pot in the form of a simple curved offset, which is secured upon the outside of the vessel, and the necessary strainer is formed simply by perforating the wall of the pot adjacent the lower edge of the spout. The lids of these pots are also usually seated directly upon the top of the pot, which renders their displacement easy of accomplishment, or necessitates their being hinged to prevent this. When the vessel is thus formed, its spout and strainer soon become clogged with the sediment escaping with the liquid as it is poured out, and, owing to the peculiar construction of the parts, said strainer and spout are very difficult to cleanse. In my invention these defects and objections are overcome as will now be shown, reference being had to accompanying drawings, in which—

Figure 1 represents a view in perspective of a tea or coffee pot constructed in accordance with my invention, and Fig. 2 a vertical transverse sectional view of the same. Fig. 3 represents a detached enlarged view of the lid.

A is the body of the vessel, of the usual tapered form, having the handle B and discharge spout or lip C at the top edge thereof. At the bottom of this body an opening, as at D, is made, around which a covering or offset, E, is placed, which tapers gradually outward from the bottom edge of the pot to just beneath the lower edge of the spout or lip C, where it terminates in a flat end, e.

As will be seen, the discharge-spout is not, as is usually the case, formed with a strainer; but this strainer is in my invention formed in the following manner: F is the lid or cover to the vessel, which in this instance is made to fit down below the top edge of the vessel upon a shoulder, a, formed for this purpose, upon one edge of which lid is secured a perforated plate, G, conforming in shape and adapted to fit close within the top portion of the spout C, just below the top edge thereof, as shown in Figs. 1 and 2. By placing the lid below the top surface of the vessel its easy displacement is prevented, and the necessary guideway for the escaping fluid beyond the strainer is secured.

In the old form of pot the sediment, grounds, &c., will escape from the vessel in the act of emptying the same, whereas by reference to my invention (shown in Figs. 1 and 2) it will be seen that the said sediment, &c., will settle and be retained at the bottom of the vessel within the offset E.

When desired to discharge the entire contents from the vessel, all that is necessary is to remove the lid and turn the vessel half over, so that the sediment, &c., will not settle in the offset, when it may be emptied out of the vessel.

By leaving the opening between the discharge-spout and body of vessel entirely free and placing the strainer in the lid, as shown in Fig. 3, instead of making said strainer a permanent fixture with the body of the vessel, the cleaning of the interior of the same is rendered easy of accomplishment, and the strainer and lid may be kept perfectly free and clean.

The offset or receptacle for the grounds, &c., being below the spout, the vessel occupies no greater space when so made than were the said receptacle omitted.

Having thus described my invention, what I claim as new therein, and desire to secure by Letters Patent of the United States, is—

1. The combination, in a tea or coffee pot composed of the body A, handle B, and discharge-spout C at the top edge, of the opening D at its bottom edge and tapered offset E e, substantially as described, for the purposes specified.

2. The combination, in a tea or coffee pot, with the body A, formed with a shoulder, a, below its top edge, handle B, and discharge-spout C, of the lid F, fitting within the top end of the pot, below the edge thereof, and upon the shoulder a, formed with a strainer, G, projecting from the front edge thereof, which conforms in outline to the interior of the discharge-spout and closely fits therein, as shown and described, for the purposes specified.

In testimony whereof I affix my signature in presence of two witnesses.

ORDELLA BRAMBLE.

Witnesses:
  O. A. FOWLER,
  GEORGE A. SHONIO.